(12) United States Patent
Liu et al.

(10) Patent No.: US 6,512,367 B2
(45) Date of Patent: Jan. 28, 2003

(54) METHOD AND APPARATUS FOR TESTING A MAGNETIC HEAD

(75) Inventors: Hua Liu, Eden Prairie, MN (US); Timothy A. Madsen, Bloomington, MN (US); Alex C. Toy, North St. Paul, MN (US); Lezlie A. Hughes, Randolph, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/776,024

(22) Filed: Feb. 2, 2001

(65) Prior Publication Data

US 2002/0041183 A1 Apr. 11, 2002

Related U.S. Application Data

(60) Provisional application No. 60/182,029, filed on Feb. 11, 2000.

(51) Int. Cl.[7] .......................... G01R 33/12; G01R 27/28
(52) U.S. Cl. ........................................ 324/210; 702/117
(58) Field of Search ................................. 324/537, 210, 324/212, 202; 360/31; 702/85, 108; 73/1.01

(56) References Cited

U.S. PATENT DOCUMENTS

| | | | | |
|---|---|---|---|---|
| 5,517,111 A | * | 5/1996 | Shelor | 324/202 |
| 5,854,554 A | | 12/1998 | Tomita et al. | 324/210 |
| 6,320,713 B1 | * | 11/2001 | Tretter et al. | 324/212 |

* cited by examiner

*Primary Examiner*—Edward Lefkowitz
*Assistant Examiner*—Toan Le
(74) *Attorney, Agent, or Firm*—Moser, Patterson and Sheridan, LLP

(57) ABSTRACT

This invention presents a method and system for testing a disc drive head usable with a disc drive head testing device. The steps for this include determining an unknown electrical property of the head testing device. This is done by generating output signals at the output stage. The testing device property is then computed by solving for the unknown electrical property based on the output signals generated for each of the known test devices. For each disc drive head under test, the head is coupled to the input lead and exposed to a stored magnetic data pattern to generate a read signal at the input lead. The measured difference affects the generated read output signal. The read output signal is adjusted based on the testing device property and the measured property to compensate for differences in the measured property.

19 Claims, 3 Drawing Sheets

Figure 2(a) Frequency Responses with Zero Boost

Figure 2(b) Frequency Responses with Optimal Boost

METHOD AND APPARATUS FOR TESTING A MAGNETIC HEAD

CROSS-REFERENCE TO RELATED APPLICATION(S)

This application claims the benefit of the filing date of U.S. provisional application Ser. No. 60/182,029 entitled "Per Head preamplifier Boost Adaptation and Amplitude Correction for Accurate HGA Electrical Test Readings with a Flat Frequency Response," which was filed on Feb. 11, 2000.

BACKGROUND

Magnetic heads are used in the data storage industry for reading and recording data onto narrow tracks on a magnetic medium. In a hard disc drive, a thin film magnetic head can be mounted to a head-gimbal-assembly, which can be used to position the head over concentric data tracks on the disc surface. Thin film magnetic heads can use transducer elements to detect resistance variations due to changes in an external magnetic medium. Examples of thin film magnetic heads include soft adjacent layer heads, giant magnetoresistive heads, and spin valve sensor heads.

After a magnetic head is fabricated, it is usually tested to ensure proper operability. Only magnetic heads that are found to be operational during these tests are used in the manufacturing of the hard disc drive. To test the magnetic heads, preamplifier can be used to amplify the signals that originate in the magnetic heads. During the magnetic head testing, however, the resistance or impedance of the preamplifier and the testing circuit can adversely effect the measurement of the magnetic head. For example, the impedance and resistance of the preamplifier, the magnetic head, and the connection between the head and the preamplifier can change the absolute gain and frequency response characteristics of the resulting output signal. The effect on the absolute gain level can cause amplitude test readings to be off by approximately 10–50% based on different head reader resistances for current giant magnetoresistive heads. The changes in frequency response can also effect amplitude readings at different frequency points as well as overall head performance because of a roll-off at higher frequencies.

SUMMARY

The present invention provides a method and system for adjusting an output signal from a hard disc drive head testing device.

In one aspect of this invention, a method for testing a disc drive head usable with a disc drive head testing device is presented. The steps for this method include determining an unknown electrical property of the head testing device. This is done by generating output signals at the output stage by consecutively coupling to the input lead each test devices having known electrical properties and generating an output signal characteristic of the known electrical properties of the test devices and the unknown electrical property of the head testing device. The testing device property is then computed by solving for the unknown electrical property based on the output signals generated for each of the known test devices. For each disc drive head under test, the head is coupled to the input lead. The head is then exposed to a stored magnetic data pattern to generate a read signal at the input lead. A read output signal is generated at the output stage based on the read signal applied to the input lead by the head. The electrical property of the head under test is measured, with the measured property differing for different disc drive heads. The difference affects the generated read output signal. The read output signal is adjusted based on the testing device property and the measured property to compensate for differences in the measured property.

Each output signal can include a frequency-dependent signal, and generating the output signal comprises generating over a range of frequencies. The step of generating an output signal further comprises generating based on a frequency-variable voltage source providing a known voltage signal over the range of different electrical frequencies. The known electrical properties of each known test device can include a resistance. The unknown electrical property of the head testing device can include an impedance. The measured property can include a resistance of the drive head under test.

The step of adjusting the read output signal can include scaling the read output signal in proportion to $$\frac{Rmr + Rin}{Rcal + Rin},$$

where $Rmr$ is the measured property, $Rin$ is the computed testing device property, and $Rcal$ is a value of a calibration device coupled to the input lead to calibrate the head test device. The output stage can include an amplifier having an adjustable amplification boost and the method can further include adjusting the amplification boost based on the measured property. The step of adjusting the amplification boost can include selecting amplification boost settings for different ranges of the measured property, the different amplification boost settings being selected to provide a similar output characteristic for different measured properties. The similar output characteristic can include a shape of a plotted output signal. The step of generating output signals can include generating a plurality of output signals using a signal generator. The method can further include determining whether the disc drive head is operational based on the adjusted read output signal.

In another aspect of this invention, a disk drive head testing apparatus includes an input lead configured for attachment to a disk drive head under test. The apparatus also includes an output stage operatively coupled to the input lead and configured to generate an output signal based on a signal received at the input lead. In addition, the apparatus includes circuitry configured to adjust the amplified output signal of the output stage based on an impedance of the testing apparatus and a resistance of a disk drive head coupled to the input lead. The apparatus can include circuitry configured to compensate the output signal to reduce gain variations due to variations in resistance of different disk drive heads coupled to the input leads. The gain variations can result from a coupling of the frequency-dependent impedance of the output stage and resistance of disk drive heads attached to the input lead. Each output signal can include a frequency-dependent signal, with the generation of the output signal over a range of frequencies.

The read output signal can be adjusted by scaling the read output signal in proportion to $$\frac{Rmr + Rin}{Rcal + Rin},$$

where $Rmr$ is the measured property, $Rin$ is the computed testing device property, and $Rcal$ is a value of a calibration device coupled to the input lead to calibrate the head test device. The output stage can additionally include a preamplifier having an adjustable amplification boost. The amplification boost can be adjusted based on the measured property. The amplification boost can include amplification boost settings for different ranges of the measured property, the different amplification boost settings can be selected to provide a similar output characteristic for different measured properties.

In another aspect of the invention, a disk drive head testing apparatus is presented. The apparatus includes an input lead configured for attachment to a disc drive head under test and an output stage operatively coupled to the input lead and configured to generate an output signal, and means to adjust the output signal based on a known testing device property and a measured testing device property to compensate for differences in the measured property.

The details of one or more embodiments of the invention are set forth in the accompanying drawings and the description below. Implementations can provide advantages such as improved accuracy in testing the magnetic head after fabrication.

DETAILED DESCRIPTION

The present invention provides a method and system for adjusting an output signal from a disc drive head testing device.

Figure 1:
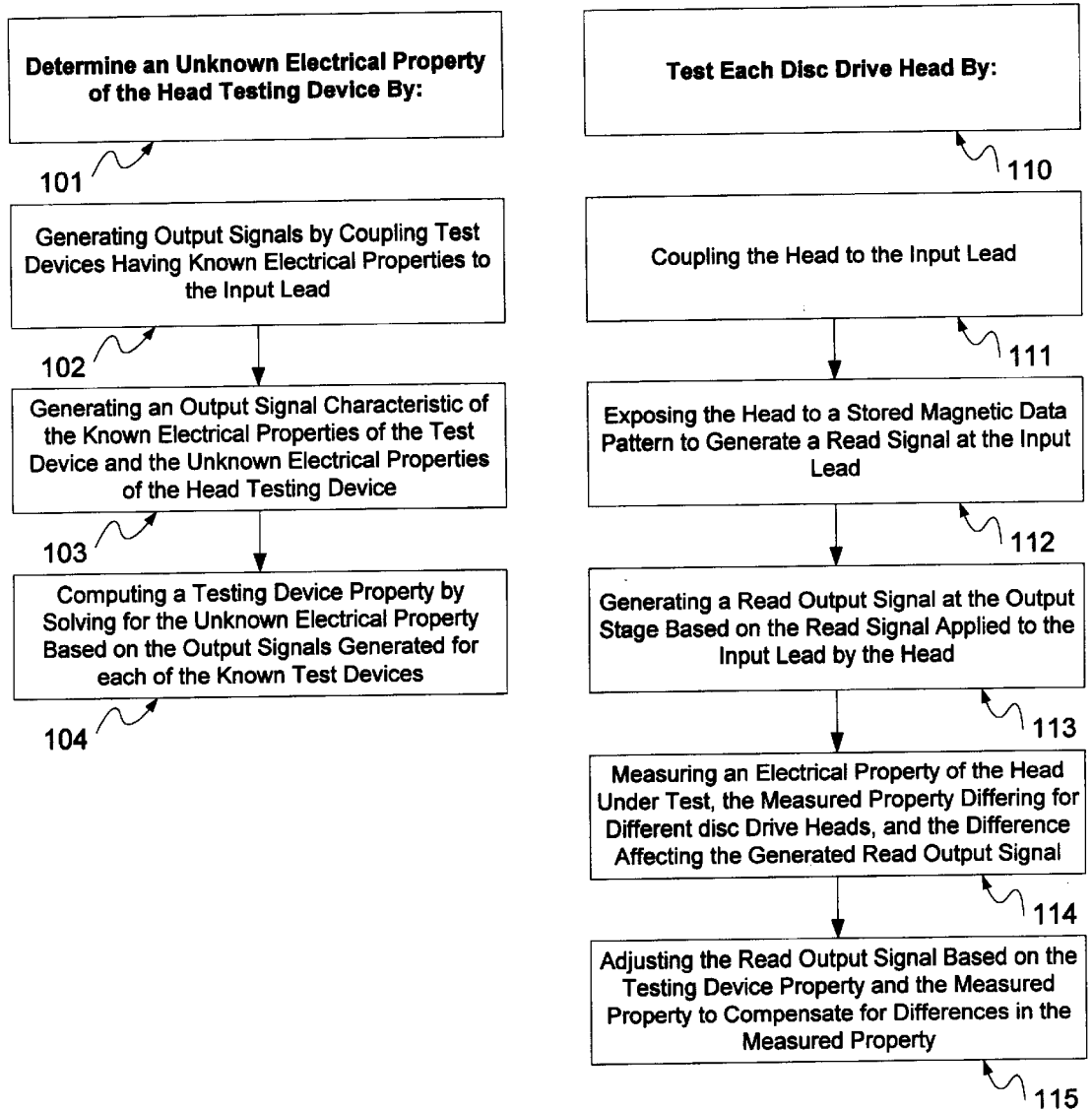
FIG. 1 is a flowchart of the method for this invention.
Figure 2A:
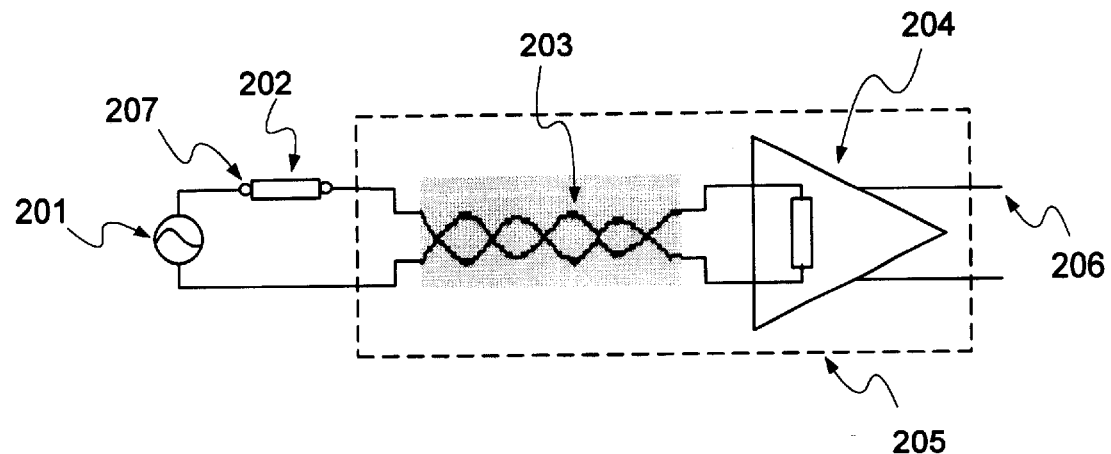
FIG. 2 are diagrams of exemplary hard disc head testing devices

Referring first to FIG. 1, a process for testing a disc drive head using a disc drive head testing device is shown. Before a disc drive head is tested, an unknown electrical property of the head testing device is determined 101. FIG. 2a is a diagram of the disc drive head testing device configured to determine the unknown electrical property of the head testing device. The configured disc drive head testing device can include a signal generator 201 or other similar device, input leads 207 connected to a test device 202, and a preamplifier 204. A twisted pair of wires, pogo wires, or other type of connection device can operably connect the preamplifier 204 to the rest of the disc drive head testing device. The preamplifier 204 includes an output stage 206 for sending the output signal.

A hard disc drive testing device resistance, Rin, can be an unknown electrical property for the device. The dotted box 205 in FIG. 2 represents the impedance of the entire testing circuit. Depending on the set up of the testing circuit, the connections 203 may not affect the impedance of the hard disc drive testing device. To determine the unknown electrical property of the head testing device, output signals at the output stage 206 are generated by consecutively coupling to the input lead 207 test devices 202 having known electrical properties 102. These known electrical properties can include a resistance, Rcal, for each test device 202. Output signal characteristics of the known electrical properties of the test device and the unknown electrical property of the head testing device are generated 103. These generated properties can be read at the output stage 206 by the preamplifier 204 or in a device attached to the hard disc drive testing device such as an electrical tester, voltage tester, or other similar type device. Finally, a testing device property, Rin, is computed by solving for the unknown electrical property based on the output signals generated for each of the known test devices 104. Rin can include an impedance as measured across different frequency responses.

Figure 2B:
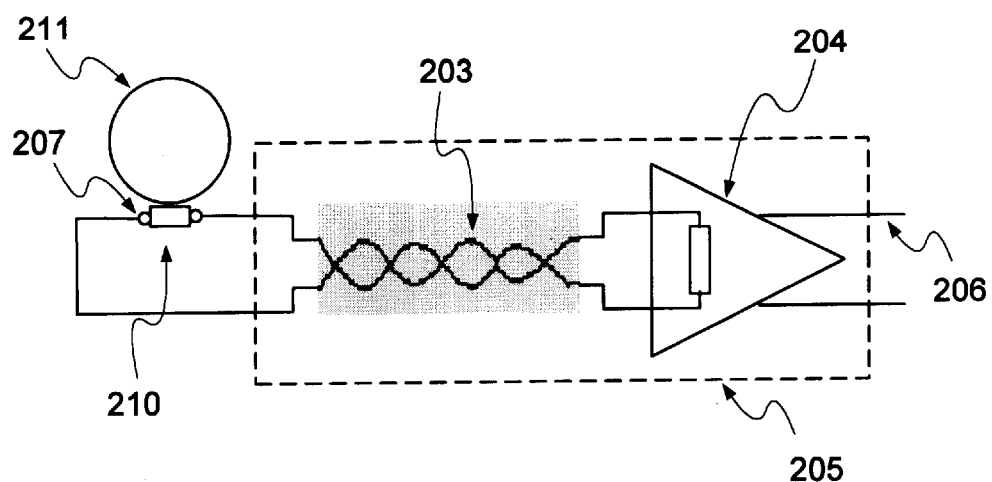

After the unknown electrical property of the head testing device is determined, each disc drive head is tested 110. FIG. 2b is a diagram of the disc drive head testing device configured to test a disc drive head. The disc drive head is coupled to the input lead 207 replacing the testing devices 111. The disc drive head is exposed to a stored magnetic data pattern 211 to generate a read signal at the input lead 112. A read output signal, Rmr, is generated at the output stage 206 based on the read signal applied to the input lead 207 by the head 113. The electrical property of the disc drive head is measured 114. This measurement can occur in the preamplifier 205 or in a device attached to the preamplifier 205, such as an electrical tester, voltage tester, an Ohm meter, or other similar type device. The output signals can include a frequency-dependent signal, which is generated over a range of frequencies. The read output signal 206 is adjusted by processing unit 209 to produce a compensated signal 209 based on the testing device property and the measured property to compensate for differences in the measured property 115.

The input signal into the preamplifier 205 can depend on both Rin and Rcal. With Rin fixed, the larger Rcal is, the smaller the measured signal current can be. The result can be that the larger the reader resistance, Rmr, of the magnetic head, the smaller the amplitude test voltage will be. The read output signal results are adjusted based on different head reader resistances as is shown in Equation 1.

$$\text{With\_Correction\_Amplitude} = \text{Without\_Correction\_Amplitude} * \frac{Rmr + Rin}{Rcal + Rin} \qquad \text{Equation 1}$$

where With_Correction_Amplitude is the corrected read output signal, Without_Correction_Amplitude is the uncorrected read output signal, Rmr is the resistance of the magnetic head, Rcal is the resistance of the testing devices, and Rin is the impedance of the hard disc drive testing device 204.

Rcal, Rin, and Rmr can be set during calibration by the calibration software and automatically delivered to the testing software. The testing software takes the Equation 1 inputs and the output signal results for each head tested and adjusts the signal using Equation 1. The resulting adjusted output signal can then be compared to a minimum or maximum level to determine whether the hard disc drive head is operational.

Equation 1 can be implemented on a circuit or a computer contained in or connected to the testing circuit. The circuit or computer can have software, firmware, or hardware designed to correct the magnetic head signal as described above.

Figure 3:
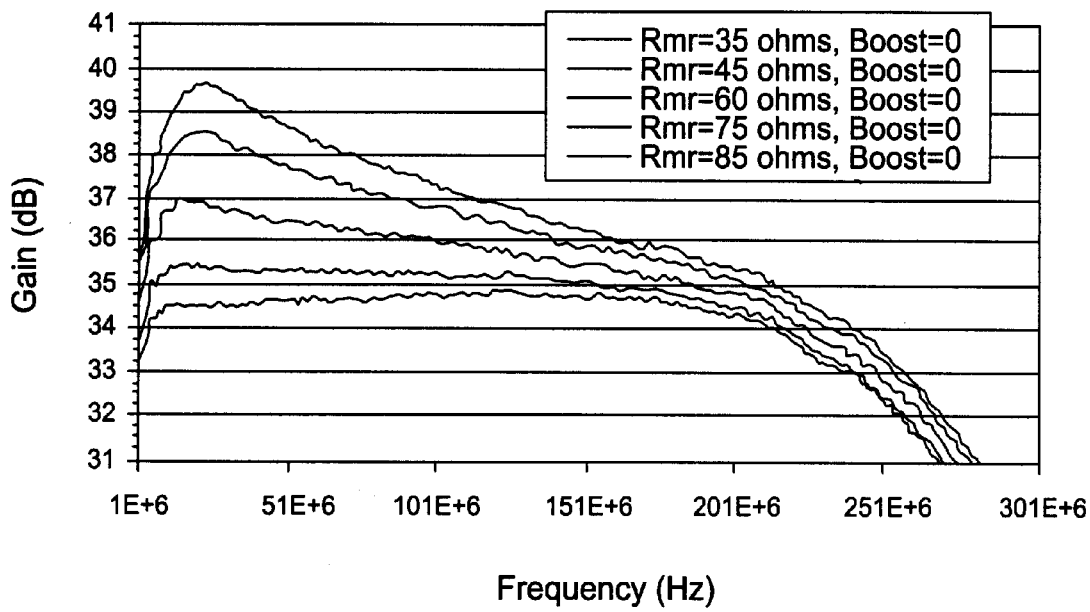
FIG. 3 is a graph of frequency responses versus Reader Resistance with no boost.

In some testing setups, Rin can change over a frequency range because of the inductance and capacitance of the hard disc drive testing device caused by the connection 203 between the preamplifier 204 and the hard disc head to be tested 210. The dependency of Rin over a frequency can show up in frequency response plots as the shape of the frequency response changes when the head reader resistance changes as is shown in FIG. 3. This dependency is not desirable because the change in Rin can independently effect the measured electrical property of the disc drive head, Without_Correction_Amplitude, in Equation 1. In this situation, the corrected amplitude, With_Correction_Amplitude, can change based on a fluctuation of Rin instead of a change in Rmr. A flat frequency response can also be desirable because the 3 dB passing bandwidth can remain constant between heads. However, the frequency response is usually not flat with the inductance and capacitance components introduced by the front end interconnect and coupling. A roll-off at higher frequencies can reduce the 3 dB pass band frequency by no greater than approximately half.

Figure 4:
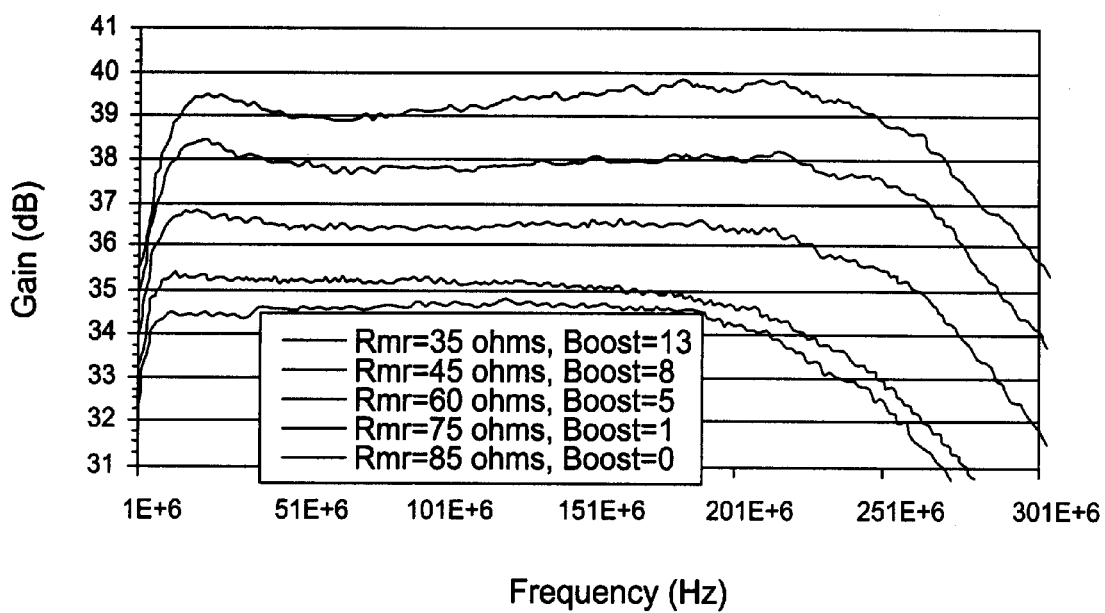
FIG. 4 is a graph of frequency responses versus Reader Resistance with optimal boost.

To remedy this, a per head preamplifier boost adaptation can be used to obtain a flat frequency response for each head. This can keep Rin constant over a frequency range and the passing bandwidth constant between the different magnetic heads being tested as is shown in FIG. 4.

The relationship between the disc head reader resistance and preamplifier boost register value can be treated as linear. The slope and offset of the equation can be characterized on the bench for each preamplifier. Once characterized, the slope and offset can be burned into the preamplifier's electrically erasable programmable read-only memory ("EEPROM"). For each head tested, the electrical testing software takes the Rmr and applies the proper amount of boost automatically by setting the Boost Register of the preamplifier according to Equation 2.

$$PreAmp\_Boost\_Register\_Value = Boost\_Slope * Rmr + Boost\_Offset \qquad \text{Equation 2}$$

In Equation 2, the Boost_Slope and Boost_Offset represent a programmable register that can be set in the preamplifier 204. The register can effect the boost characteristics of the signal sent through the preamplifier 204. It is possible that with different connections 203 the slope and offset characteristics can be different. If the variation is significant enough, the preamplifier 204 may need to be re-characterized.

The per head preamplifier boost adaptation can be used to obtain flat frequency responses for each head, keeping Rin constant over the frequency range, and the 3 dB passing bandwidth constant between heads.

Equation 2 can be implemented on a circuit or a computer contained in or connected to the testing circuit. The circuit or computer can have software, firmware, or hardware designed to correct the preamplifier boost register value as described above.

Although the present invention has been described with references to preferred embodiments, workers skilled in the art will recognize that changes may be made in form and detail without departing from the spirit and scope of the invention.

What is claimed is:

1. A disc drive head testing method usable with a disc drive head testing unit comprising an input lead configured for attachment to a disc drive head under test and an output stage operatively coupled to the input lead and configured to generate an output signal, the method comprising:
   determining an unknown electrical property of the head testing unit by:
      generating a plurality of output signals at the output stage by consecutively coupling to the input lead each one of a plurality of test devices having known electrical properties and generating an output signal characteristic of the known electrical properties of the test devices and the unknown electrical property of the head testing unit, and
      computing a head testing unit property by solving for the unknown electrical property based on the output signals generated for each of the known test devices; and
   for a disc drive head under test,
      coupling the head to the input lead;
      exposing the head to a stored magnetic data pattern to generate a read signal at the input lead;
      generating a read output signal at the output stage based on the read signal applied to the input lead by the head;
      measuring an electrical property of the head under test, the measured property differing for different disc drive heads, said difference affecting the generated read output signal; and
      adjusting the read output signal based on the testing unit property and the measured property to compensate for differences in the measured property.

2. The method of claim 1 wherein:
   each output signal comprises a frequency-dependent signal, and generating the output signal comprises generating over a range of frequencies.

3. The method of claim 2 wherein generating an output signal further comprises generating based on a frequency-variable voltage source providing a known voltage signal over the range of different electrical frequencies.

4. The method of claim 1 wherein:
   the known electrical properties of each known test device comprise a resistance; and
   the unknown electrical property of the head testing unit comprises an impedance.

5. The method of claim 1 wherein the measured property comprises a resistance of the drive head under test.

6. The method of claim 5 wherein adjusting the read output signal comprises scaling the read output signal in proportion to $$\frac{Rmr + Rin}{Rcal + Rin}$$

wherein:
   Rmr is the measured property,
   Rin is the computed head testing unit property, and
   Rcal is a value of a calibration device coupled to the input lead to calibrate the head testing unit.

7. The method of claim 1 wherein the output stage comprises an amplifier having an adjustable amplification boost and the method further comprises adjusting the amplification boost based on the measured property.

8. The method of claim 7 wherein adjusting the amplification boost comprises selecting amplification boost settings for different ranges of the measured property, the different amplification boost settings being selected to provide a similar output characteristic for different measured properties.

9. The method of claim 8 wherein the similar output characteristic comprises a shape of a plotted output signal.

10. The method of claim 1 wherein the step of generating a plurality of output signals comprises generating a plurality of output signals using a signal generator.

11. The method of claim 1 further comprising determining whether the disc drive head is operational based on the adjusted read output signal.

12. A disk drive head testing apparatus comprising:
   an input lead configured for attachment to a disk drive head under test;

an output stage operatively coupled to the input lead and configured to generate an output signal based on a signal received at the input lead; and processing unit that adjusts the amplified output signal of the output stage based on an impedance of the head testing apparatus and a resistance of a disk drive head coupled to the input lead.

13. The apparatus of claim 12 wherein said processing unit further compensates the output signal to reduce gain variations due to variations in resistance of different disk drive heads coupled to the input leads.

14. The apparatus of claim 13 wherein said gain variations result from a coupling of the frequency-dependent impedance of the output stage and resistance of disk drive heads attached to the input lead.

15. The system of claim 12, wherein:

each output signal comprises a frequency-dependent signal, and said processing unit generates output signals over a range of frequencies.

16. The apparatus of claim 12 wherein said processing unit further adjusts the output signal by scaling the read output signal in proportion to $$\frac{Rmr \pm Rin}{Rcal \pm Rin}$$

wherein:

Rmr is the resistance of the disk drive head coupled to the input lead, Rin is a computed head testing apparatus impedance; and Rcal is a resistance of a calibration device coupled to the input lead to calibrate the head test device.

17. The apparatus of claim 12 wherein the output stage additionally comprises:

a preamplifier having an adjustable amplification boost; and wherein said processing unit further adjusts the amplification boost based on the resistance of the disk drive head coupled to the input lead.

18. The apparatus of claim 17 wherein said processing adjusts the amplification boost settings for different resistance ranges of the resistance of the disk drive head coupled to the input lead.

19. A disk drive head testing apparatus comprising:

an input lead configured for attachment to a disc drive head under test and an output stage operatively coupled to the input lead and configured to generate an output signal; and means for adjusting the output signal based on a predetermined unknown test apparatus property and a measured head testing apparatus property to compensate for differences in the measured property.

* * * * *